US005319349A

United States Patent [19]

Smith, III

[11] Patent Number: 5,319,349

[45] Date of Patent: Jun. 7, 1994

[54] PAGER SAFETY SYSTEM

[76] Inventor: Frank E. Smith, III, P.O. Box 27103, Oakland, Calif. 94602

[21] Appl. No.: 868,017

[22] Filed: Apr. 13, 1992

[51] Int. Cl.[5] .................... H04Q 1/30

[52] U.S. Cl. .................... 340/311.1; 340/571; 340/572; 24/3 J; 24/3 L; 24/3 G; 24/3 H; 24/6; 24/11 M; 24/11 P; 24/12; 24/13

[58] Field of Search .................... 340/311.1, 394, 407, 340/388, 391, 571, 572; 24/3 J, 3 L, 3 G, 3 H, 6, 11 M, 11 P, 12, 13; 248/255.31

[56] References Cited

U.S. PATENT DOCUMENTS

| | | | |
|---|---|---|---|
| 3,808,642 | 5/1974 | Nation | 24/11 P |
| 3,914,829 | 10/1975 | Paskert | 24/263 R |
| 3,988,724 | 10/1976 | Anderson | 340/572 |
| 4,001,805 | 1/1977 | Golbe | 340/527 |
| 4,536,925 | 8/1985 | Boothe et al. | 24/3 J |
| 4,573,042 | 2/1986 | Boyd et al. | 340/539 |
| 4,741,074 | 5/1988 | Budano, II et al. | 24/3 J |
| 4,812,811 | 3/1989 | Asbrink et al. | 340/572 |
| 4,837,559 | 6/1989 | Green, Sr. | 340/572 |
| 4,881,150 | 11/1989 | Oyamada | 24/3 J |
| 4,897,898 | 2/1990 | Chapin | 24/3 L |
| 4,956,895 | 9/1990 | Hayasaka | 24/3 J |
| 5,019,801 | 5/1991 | Anderson, III | 340/572 |
| 5,075,931 | 12/1991 | Van Kuijk | 24/3 J |

*Primary Examiner*—John K. Peng
*Assistant Examiner*—Nina Tong
*Attorney, Agent, or Firm*—Harris Zimmerman

[57] ABSTRACT

Accessory components aid in preventing loss of a pager of the type that emits an audible and/or visual signal in response to radio signals and which has a clip member pivoted to the pager housing for attaching the pager to another article and a clip tensioning spring which acts to pivot the member towards the housing. In the preferred form, one such component positions an auxiliary spring between the housing and clip member to supplement the force of the pager tensioning spring and enables adjustment of the auxiliary spring force to compensate for a weakened tensioning spring. Another component emits a perceptible signal when the clip member is pivoted outward from the housing to detect accidental dislodgment or theft of the pager.

17 Claims, 3 Drawing Sheets

PAGER SAFETY SYSTEM

TECHNICAL FIELD

This invention relates to personal pagers of the type which emit an audible or visual signal or both in response to coded radio signals and more particularly to accessory components which reduce the risk of loss of a pager.

BACKGROUND OF THE INVENTION

Pagers enable rapid alerting of persons of the need to contact others at a distant location or to perform some act such as returning to a particular site. In most instances this requires that the person carry the pager from place to place. To reduce the risk of loss, pagers typically have a clip member that is pivoted to the pager housing and a tensioning spring urges the member towards a wall of the housing. This allows the pager to be clipped to any of various articles that accompany the user of the pager such as a carrier case, a belt, a pocket or other portion of the person's clothing.

The clip is helpful but loss of pagers remains a common occurrence. The clip tensioning spring tends to weaken after extended use at which time various movements of the person carrying the pager can easily dislodge the device and the person may not be immediately aware of the loss. Pagers are also attractive to thieves who may be able to unclip and remove the device without the owner being aware of the occurrence.

Thus more effective measures for reducing the risk of losing a pager by inadvertent dislodgment or surreptitious theft would be highly beneficial to the owners of such devices.

The present invention is directed to overcoming one or more of the problems discussed above.

SUMMARY OF THE INVENTION

In one aspect, the present invention provides apparatus for preventing loss of a pager of the type having a pager housing, a clip member pivoted to the housing at a location that is spaced away from a first end of the clip member and a clip tensioning spring that urges the first end of the clip member towards the housing. The apparatus includes a frame proportioned to fit between the pager housing and the clip member and an auxiliary spring carried by the frame in position to exert a force on the clip member that supplements the force exerted by the clip tensioning spring. Means are provided for selectively changing the force which the auxiliary spring exerts on the clip member.

In another aspect, the invention provides means for emitting a perceptible signal in response to pivoting of the clip member outwardly from the pager housing.

In another aspect of the invention, safety apparatus for preventing loss of a pager which has a housing, a pivotable clip member for attaching the housing to another article and a clip tensioning spring that acts to urge a first end of the member towards the pager housing. The apparatus includes a sensor housing proportioned to fit between the pager housing and the clip member and having means for retaining an electrical battery. An electrical switch is attached to the sensor housing and has an actuator situated outside of the sensor housing in position to be held at a first switch setting by compression between the clip member and the pager housing when the clip member is pivoted towards the pager housing and to be released into a second switch setting when the clip member is pivoted outward from the pager housing. Electrically operated signaling means emit a perceptible signal when the actuator switches from the first setting to the second setting.

In a further aspect, the invention provides a pager which produces a perceptible signal in response to radio signals and which has a pager housing, a clip member pivoted to the housing for fastening the pager to another article and a clip tensioning spring which acts to pivot the clip member towards the pager housing. A frame is secured to the pager between the pager housing and the clip member and carries an auxiliary spring which is positioned to exert a force on the clip member that supplements the force that is exerted on the member by the clip tensioning spring. Means are provided for selectively varying the tension in the auxiliary spring to adjust the force which the spring exerts on the clip member.

In still another aspect, the invention provides a pager which produces a perceptible signal in response to radio signals and which has a pager housing, a clip member pivoted to the housing for fastening the pager to another article and a clip tensioning spring which acts to pivot the clip member towards the pager housing. A sensor housing is secured to the pager between the pager housing and the clip member and has means for retaining an electrical battery. An electrically actuated signal emitting device is secured to the sensor housing. An electrical switch is attached to the sensor housing and has a switch actuator positioned to be held at a first switch setting by compression between the clip member and pager housing when the clip member is pivoted towards the pager housing and to be released into a second switch setting when the clip member is pivoted outward from the pager housing. The pager further includes means for transmitting electrical current to the signal emitting device when the actuator switches from the first setting to the second setting.

In one aspect the invention provides for more secure retention of a pager by enabling adjustment of the clip tensioning force to compensate for weakening of the primary clip tensioning spring. In another aspect the invention provides a perceptible signal when a pager is unclipped from the article to which it has been fastened. This alerts the owner that the pager has been removed by inadvertent dislodgement or by another person. Pager accessory components for these purposes are compact, easily installed and can be provided as a kit of components for installation on preexisting pagers.

The invention, together with further aspects and advantages thereof, can be further understood by reference to the following description of the preferred embodiment and by reference to the accompanying drawings.

DETAILED DESCRIPTION OF THE PREFERRED EMBODIMENT

Figure 1:
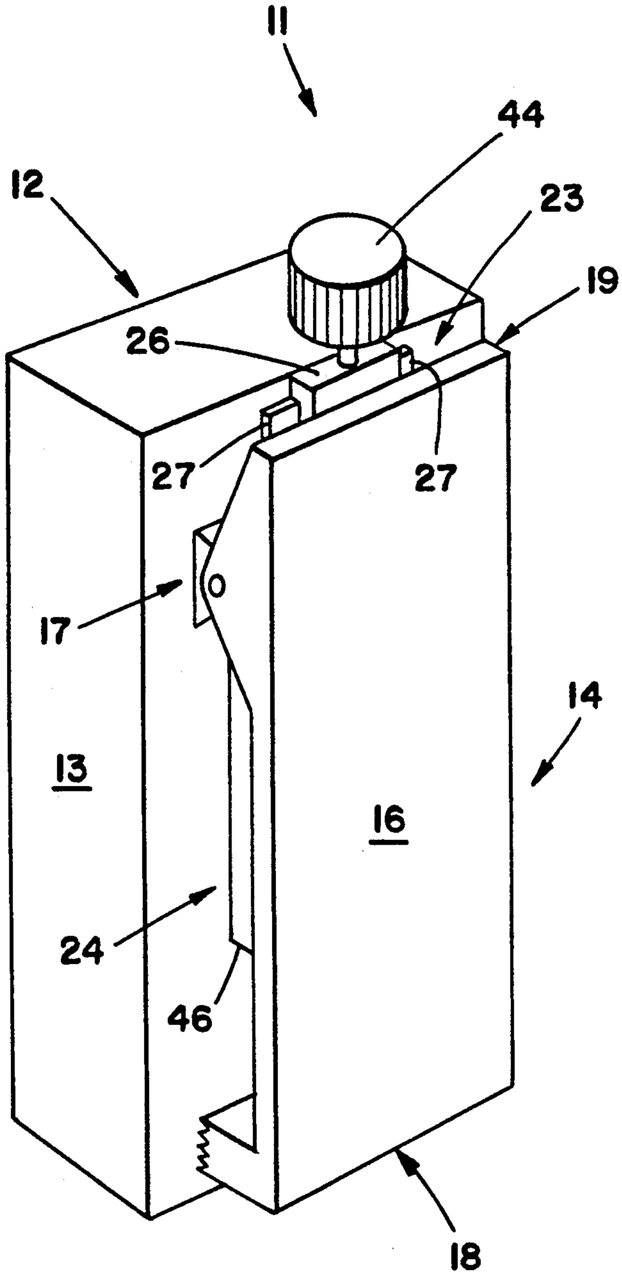
FIG. 1 is a perspective view of a typical pager after installation of safety accessory components, for preventing loss of the pager in accordance with the preferred embodiment of the invention.
Figure 2:
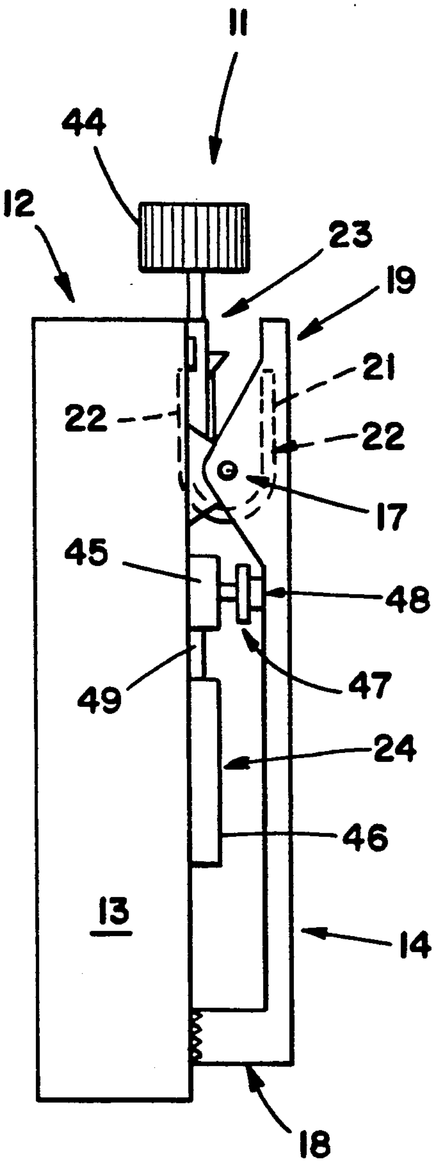
FIG. 2 is a side view of the pager and accessory apparatus of FIG. 1.

Referring initially to FIGS. 1 and 2 of the drawings, the pager safety apparatus 11 of this embodiment of the invention is designed for installation on a preexisting pager 12 of the known type which emits an audible sound or visual signal or both in response to radio frequency signals that are coded to identify the particular pager. Similar components can also be installed at the factory during manufacture of pagers 12. The pager 12 itself may be of the known conventional design and thus internal components of the pager need not be described.

Such pagers 12 have a pager housing 13 that is typically of rectangular shape. A clip member 14 extends along one face of the pager 12 to enable fastening of the pager to another article which is typically some portion of the user's clothing or some other article that is carried by the user. The clip member 14 has a flat portion 16 that is spaced apart from pager housing 13 and which is coupled to the housing by a pivot joint 17 that enables one end 18 of the member to be pivoted outward from the housing. The pivot joint 17 is spaced a small distance away from the opposite end 19 of the clip member to enable the pivoting to be accomplished by thumb pressure on the opposite end. A U-shaped clip tensioning spring 21 loops around the pivot axis of joint 17 and has opposite arms 22 that extend along clip member 14 and pager housing 13, away from end 18 of the clip member, and which are secured to the member and the housing by adhesive or other means. Spring 21 is tensioned to urge end 19 of the clip member 14 outward from pager housing 13 and thus exerts a force that acts to pivot the other end 18 towards the housing and to thereby clamp the pager to an article that extends between the housing and clip member. End 18 of the clip member 14 may be angled inward towards housing 13 and be provided with serrations to aid in gripping articles to which the pager 12 is clipped.

In the preferred form of the invention, the safety apparatus 11 accessories include both an adjustable auxiliary clip tensioning component 23 and a pager removal sensing component 24 which jointly function to prevent loss of the pager although either component can contribute to that objective in the absence of the other. The auxiliary clip tensioning component 23 provides means for supplementing the force that is exerted on clip member 14 by a weakened clip tensioning spring 22 and enables adjustment or changing of the amount of supplemental spring force. This counteracts the increased risk of accidental detachment of the pager 12 from an article to which it is clipped that can otherwise arise from the weakened spring and enables successive increases in the supplemental force as spring deterioration progresses. The pager removal sensing component 24 provides means for emitting a perceptible signal in response to pivoting of clip member 14 outward from pager housing 13 which pivoting movement occurs in the course of unclipping of the pager from an article. This alerts the owner when the pager 12 is unclipped and enables the owner to detect the location of the pager immediately after it is unclipped.

The auxiliary clip tensioning component 23 of this example has a rectangular frame 26 proportioned to fit between the pager housing 13 and clip member 14 in the end 19 region of the clip member. Tabs 27 extend from each side of frame 26 and are coated with adhesive to secure the component 23 to pager 12. The component 23 is adhered to pager housing 13 in the present example of the invention but may also be faced in the opposite direction and be adhered to the clip member 14.

Figure 3:
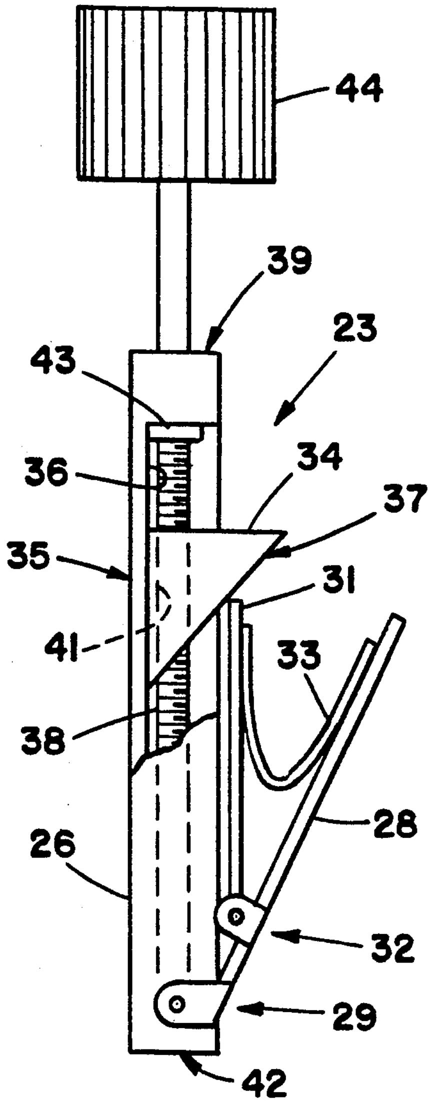
FIG. 3 is a side view, shown partially in section, of an auxiliary clip tensioning component of the invention.
Figure 4:
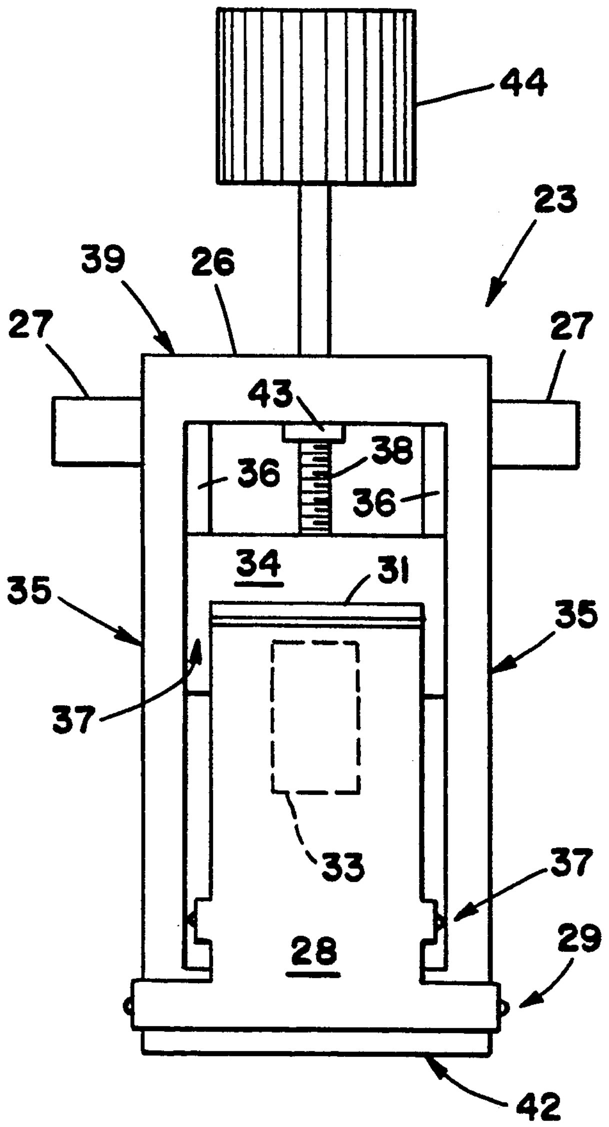
FIG. 4 is a front view of the auxiliary clip tensioning component of FIG. 3.

Referring jointly to FIGS. 3 and 4, an auxiliary spring cover plate 28 extends along a portion of frame 26 in angled relationship with the frame and is coupled to the frame by hinging means 29 that enable pivoting movement of the plate relative to the frame. A spring platform plate 31 extends along the frame 26 between the frame and cover plate 28 and is coupled to the cover plate by additional hinging means 32. Thus the two plates 28 and 31 can both pivot outward and inward relative to frame 26 and can pivot relative to each other.

Supplemental clip tensioning force is created by an auxiliary spring 33 situated between the pivotable plates 28 and 31. Spring 33 is a leaf spring of substantially U-shaped configuration in this embodiment, although other forms of spring may also be used, and is preferably secured to one of the plates 28 and 31 by adhesive or the like. The auxiliary spring 33 is positioned and tensioned to produce a spring force that acts to urge the plates 28 and 31 apart. The auxiliary spring 33 has first and second ends positioned to exert forces on the second end 19 of the clip member 14 and the pager housing 13 that urge the second end of the clip member outward from the pager housing.

To enable selective adjustment of the force which is exerted by the auxiliary spring 33, a slidable cain 34 is seated in recessed tracks 36 that extend along the two side portions 35 of frame 26. Cam 34 has an angled ramp surface 37 that faces platform plate 31 and a portion of the surface extends into the region between that plate and frame 26. Thus, cam 34 can wedge the pivotable platform plate outward from frame 26 by sliding the cam in the direction of the platform plate.

Cam 34 may be traveled along tracks 36 by rotation of a rod 38 which is in threaded engagement with the cam. Rod 38 extends through the end portion 39 of frame 26 that is remote from hinging means 29, engages with a threaded passage 41 in the cam 34 and extends on into the opposite end portion 42 of the frame. An annular flange 43 is secured to rod 38 immediately inside the frame end portion 39 to prevent axial movement of the rod. Thus rotation of rod 38 in one rotary direction forces movement of cam 34 towards end portion 42 of frame 26 and rotation in the opposite direction retracts the cam away from that end of the frame. Rod 38 extends outward from end portion 39 of the frame 26 and is provided with a knurled knob 44 to facilitate adjustment of the force exerted by the auxiliary spring 33.

Referring to FIGS. 1 and 3 in conjunction, securing the auxiliary clip tensioning component 23 to pager 12 in the previously described manner causes the pivotable cover plate 28 to bear against the end region 19 of the Pager clip member 14. Travel of cam 34 towards platform plate 31 by rotation of I,,nob 44 pivots that plate outward and compresses auxiliary spring 33 between the two plates 28 and 31. This creates a supplemental spring force that supplements the force exerted on clip member 14 by the primary clip tensioning spring 22 which supplemental force may be selected to compensate for deterioration of the primary spring or to provide a greater spring force that was established by the manufacturer of the pager.

Referring again to FIGS. 1 and 2 in conjunction, the pager removal sensing component 24 may have a thin flat sensor housing 46 proportioned to fit between pager housing 13 and clip member 14 at the region which is between clip tensioning spring 22 and end 18 of the clip member. Sensor housing 46 is secured to pager housing 13 with adhesive or by other means in this example, although the housing can also be turned around and be secured to the clip member 14.

Component 24 further includes an electrical switch 47, of the push button type in this example, which is attached to a switch housing 45 and which has an actuator button 48 positioned to be depressed into a first setting by the clip member 14 when the clip member is pivoted against pager housing 13 and to be released into a second setting then the clip member is pivoted outward from the pager housing. Switch housing 45 is spaced from the sensor housing 46 and coupled to the housing by a connector ribbon 49 in which the electrical conductors 51 that connect with switch 47 are embedded. Connector ribbon 49 is preferably flexible to enable variation of the position of the switch housing 45 relative to sensor housing 46 in order to adapt the unit to emplacement in pagers of different configurations.

Figure 6:
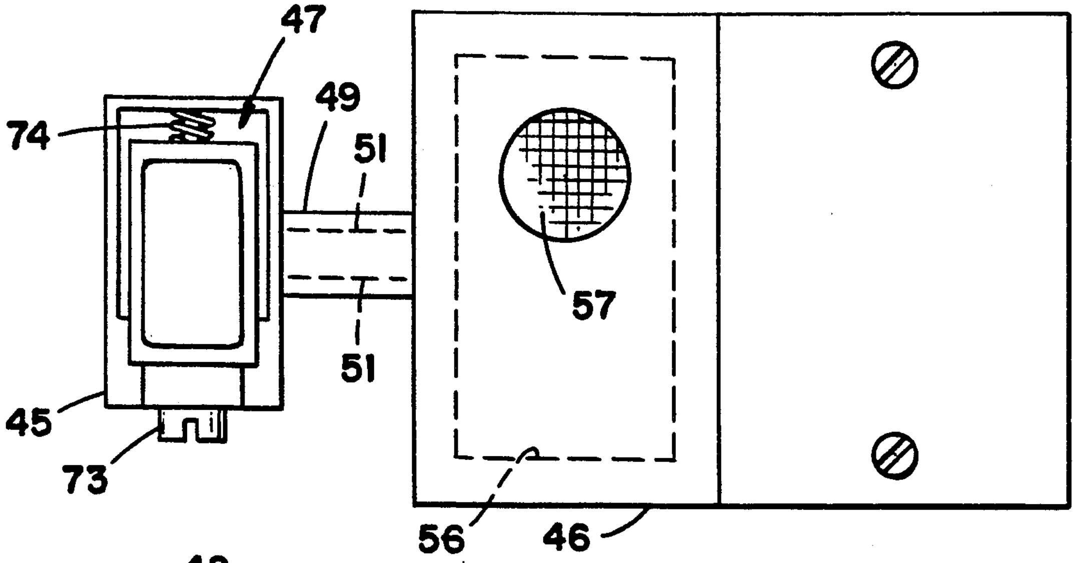
FIG. 6 is a front view of the pager removal sensing component.
Figure 5:
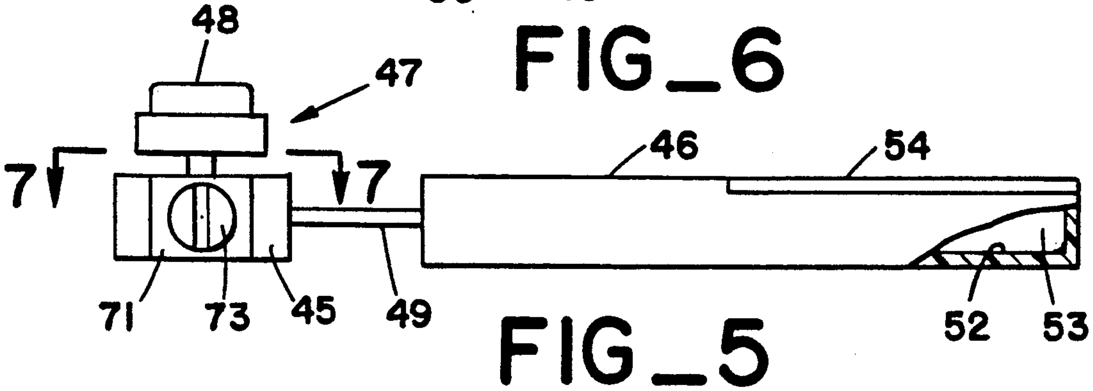
FIG. 5 is a side view, shown partially in section, of a pager removal sensing component of the apparatus of the preceding figures.

Referring jointly to FIGS. 5 and 6, sensor housing 46 has an internal compartment 52 for retaining an electrical battery 53 which compartment has a removable cover 54 to provide for battery replacement. Electrical circuit components to be hereinafter described are contained in another compartment 56. Such components in this example include an electrically actuated sound emitting device 57 which may be a beeper of the known type that are used in pagers and other sound emitting electronic equipment. The beeper 57 may be replaced with an indicator light, such as a light emitting diode, or the sensor housing 46 may carry both an audible signal generator and a visual signal emitter.

Figure 9:
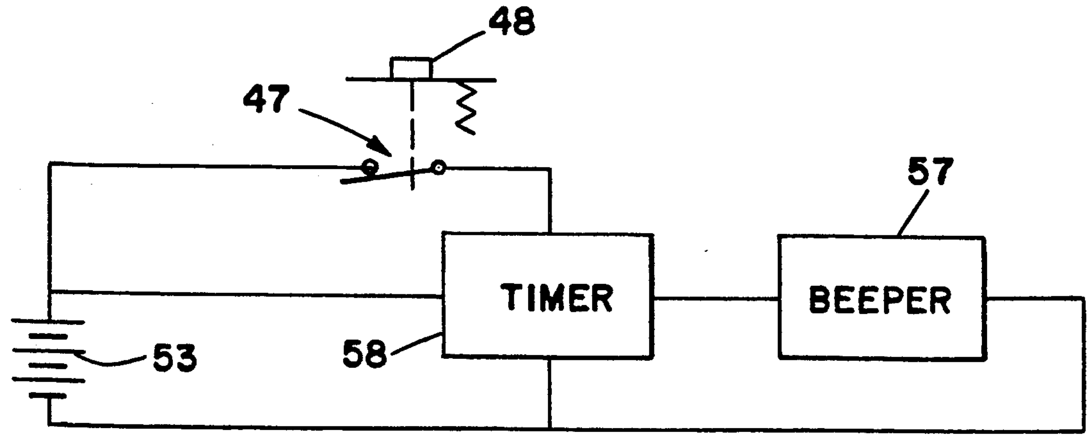
FIG. 9 is a schematic diagram of the electrical circuit of the pager removal sensing component.

Referring jointly to FIGS. 2 and 9, switch 47 is spring biased to a closed position but is held in the open position when the actuator 48 is depressed by clip member 14. Outward pivoting of the clip member 14 releases actuator button 48 and allows the switch 47 to assume its normal closed condition. At the closed position, switch 47 transmits a trigger signal voltage from battery 53 to a timer circuit 58 which may be of known form and which transmits actuating current from the battery to beeper 57 for a limited period of time following each closure of switch 47. The timer 58 may, for example, energize beeper 57 for three to five seconds following each switch closure although shorter or longer periods or a continuous signal may be appropriate for some pager usages.

With reference to FIG. 2 in particular, it is advantageous to provide for selective changing of the position of the switch actuator button 48 relative to the pager housing 13 to enable the switch 47 including the actuator button to be shifted outward from the pager housing or to be positioned closer to the pager housing. This enables adjustment to accommodate the accessory component 24 to pagers that may have different spacing of the clip member 14 from the pager housing 13 and enables adjustment of the sensitivity of the apparatus to clip member movement.

Figure 7:
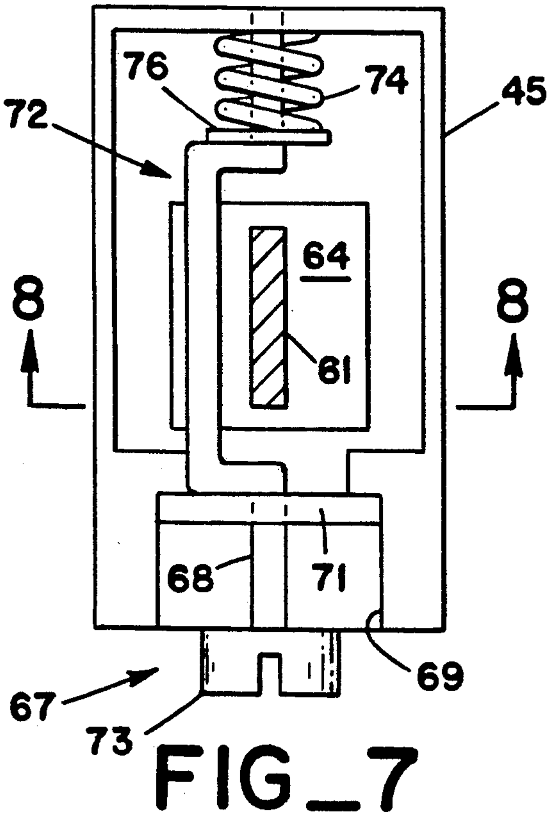
FIG. 7 is a cross section view of a portion of the pager removal sensing component taken along line 7—7 of FIG. 5.
Figure 8:
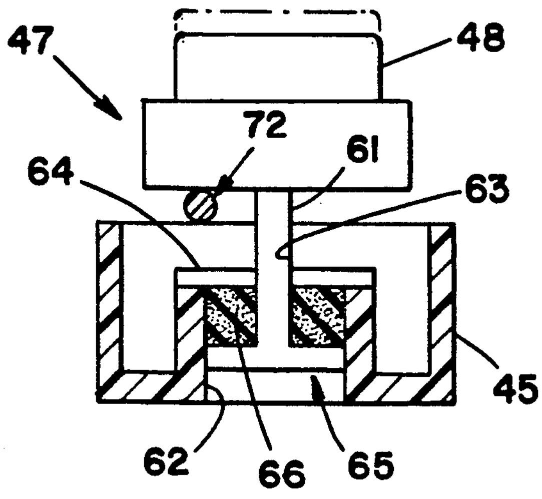
FIG. 8 is a cross section view taken along line 8—8 of FIG. 7.

Referring to FIGS. 7 and 8, such movement of the switch 47 is provided for in this example by a stem 61 which extends from the base of the switch into a chamber 62 in switch housing 45 through a conforming opening 63 in the top wall 64 of the chamber. The base of the stem 61 has sidewardly extending members 65 and the region between the members 65 and chamber top wall 64 is filled with a compressible resilient material 66 such as sponge rubber. The resilient material 66, which could be replaced with a spring, acts to draw switch 47 into close proximity to switch housing 45 in the absence of a counter force.

The means 67 for selectively changing the position of switch actuator 48 includes a rotatable shaft 68 which extends into a notch 69 in one end wall of switch housing 45, through a partition 71 which is secured to the housing at the inner end of the notch and on into the opposite end wall of the housing. Shaft 68 is angled to provide a central region 72 on the shaft that is offset from the rotational axis of the shaft and from the switch stem 61 and which extends into contact with the base of switch 47. Thus the switch 47 can be forced outward from switch housing 47 by turning shaft 68. Opposite rotational movement of shaft 68 enables the compressed resilient material 66 to draw the switch 47 closer to the housing 47. A screw head 73 at the end of shaft 68 which protrudes from notch 69 enables such turning of the shaft with a screwdriver or similar tool. A helical compression spring 74 is disposed in coaxial relationship with the end of the shaft 68 that is remote from screw head 73 and has one end abutting the adjacent end wall of switch housing 47 and an opposite end that abuts an annular washer 76 on the shaft that seats against the adjacent end of the offset central region 72 of the shaft. Spring 74 is under compression and thus acts to hold the offset central region 72 of shaft 68 at the angular orientation that has been selected by turning of the shaft.

Thus the offset central region of shaft 68 can be positioned to hold the switch actuator button 48 outward from the switch housing for a distance that is determined by the angular orientation of the central region 72 of the shaft. Consequently, the spacing of the switch actuator button 48 from the pager housing can be adjusted for the previously described purposes by turning screw head 73 to change the angular orientation.

The audible signal which is emitted by the pager removal sensing component 24 in response to outward pivoting of clip member 14 immediately alerts the owner of the pager when the pager is unfastened from an article to which it has been clipped and serves the further purpose of enabling sensing of the location of the pager in the event that it has been dropped to concealed at a location where it is not visible.

While the invention has been described with reference to a particular embodiment for purposes of example, many modifications and variations are possible and it is not intended to limit the invention except as defined in the following claims.

I claim:

1. Safety apparatus for preventing the loss of a pager which pager has a housing, a clip member for attaching the housing to another article, the clip member being pivoted to said housing at a location that is spaced away from a first end of the clip member member and a clip tensioning spring that acts to urge said first end of said clip member towards said housing, wherein said safety apparatus comprises:

a frame proportioned to fit between said pager housing and said clip member, an auxiliary spring carried by said frame in position to exert a force on said clip member that is separate from the force that is exerted thereon by said clip tensioning spring and which supplements the force that is exerted on said clip member by said clip tensioning spring, and means for selectively changing the force which said auxiliary spring exerts on said clip member.

2. The apparatus of claim 1 wherein said clip member has a second end that extends beyond said pivot location and wherein said auxiliary spring is positioned on said frame to fit between said second end of said clip member and said pager housing and has first and second ends positioned to exert forces on said second end of said clip member and said pager housing that urge said second end of said clip member outward from said pager housing.

3. The apparatus of claim 1 further including means for emitting a perceptible signal at said pager in response to pivoting of said clip member outwardly from said pager housing.

4. The apparatus of claim 3 wherein said means for emitting a perceptible signal includes a sensor housing proportioned to fit between said pager housing and said clip member and having means for retaining an electrical battery, an electrical switch attached to to said sensor housing and having an actuator situated outside of said sensor housing in position to be held at a first switch setting by compression between said clip member and said pager housing when said clip member is pivoted towards said pager housing and to be released into a second switch setting when said clip member is pivoted away from said pager housing, an electrically actuated signal generator and means for transmitting current to said signal generator following movement of said actuator to said second switch setting.

5. Safety apparatus for preventing loss of a pager which pager has a housing, a clip member for attaching the housing to another article, the clip member being pivoted to said housing at a location that is spaced away from a first end of the clip member and a clip tensioning spring that acts to urge said first end of said clip member towards said housing, wherein said safety apparatus comprises:

a frame proportioned to fit between said pager housing and said clip member, an auxiliary spring carried by said frame in position to exert a force on said clip member that supplements the force that is exerted thereon by said clip tensioning spring, and means for selectively changing the force which said auxiliary spring exerts on said clip member, wherein said clip member has a second end that extends beyond said pivot location and wherein said auxiliary spring is positioned on said frame to fit between said second end of said clip member and said pager housing and has first and second ends positioned to exert forces on said second end of said clip member and said pager housing that urge said second end of said clip member outward from said pager housing, further including an outer spring cover plate and an inner spring platform plate extending along a portion of said frame in angled relationship therewith and in angled relationship with each other, said auxiliary spring being disposed between said plates and being fastened to at least one thereof, and wherein said apparatus further includes hinging means for enabling pivoting of said plates relative to said frame and relative to each other.

6. The apparatus of claim 5 wherein said means for selectively changing the force which said auxiliary spring exerts on said clip member includes a cam which is slidable along said frame and which has a ramp surface that is angled relative to said inner spring platform and which extends between said frame and said platform in position to pivot said platform outward from said frame as said cam is translated towards said hinging means, and a threaded rotatable rod extending along said frame and having a threaded engagement with one of said cam and said frame and being immovable in the axial direction relative to the other thereof.

7. The apparatus of claim 5 wherein said auxiliary spring has a substantially U-shaped configuration, said first and second ends of said auxiliary spring being diverging arms which extend along and bear against said cover plate and said platform plate respectively.

8. Safety apparatus for preventing loss of a pager which pager has a housing, a clip member for attaching the housing to another article, the clip member being pivoted to said housing at a location that is spaced away from a first end of the clip member and a clip tensioning spring that acts to urge said first end of said clip member towards said housing, wherein said safety apparatus comprises:

a frame proportioned to fit between said pager housing and said clip member, an auxiliary spring carried by said frame in position to exert a force on said clip member that supplements the force that is exerted thereon by said clip tensioning spring, and means for selectively changing the force which said auxiliary spring exerts on said clip member, wherein said pager clip member has a second end that extends beyond said pivot location and wherein said frame of said safety apparatus is proportioned to fit between said pager housing and said second end of said clip member, said frame having a cam track extending therealong, further including a cover plate having a first edge hinged to said frame and an opposite edge which is pivotable outward from said frame, a platform plate having one edge hinged to one of said frame and said cover plate and an opposite edge that is pivotable outward from said frame and pivotable relative to said cover plate, and wherein said auxiliary spring is disposed between said cover plate and platform plate in position to urge said plates apart, and wherein said means for selectively changing the force which said auxiliary spring exerts on said clip member includes a cam which is selectively translatable along said cam track of said frame and which has an inclined ramp surface that extends between said frame and said opposite edge of said platform plate to wedge said platform plate outwardly from said frame and thereby increase the force which said auxiliary spring exerts on said pager clip member.

9. The apparatus of claim 8 wherein said means for selectively changing the force which said auxiliary spring exerts on said clip member further includes a threaded rod extending in parallel relationship with said cam track and which is of sufficient length to extend out of the region between said pager housing and said clip member, said threaded rod having a threaded engagement with one of said cam and said frame and being fixed against axial movement relative to the other thereof, and a selectively rotatable knob secured to said rod at the end thereof that is remote from said cam.

10. Safety apparatus for preventing loss of a pager which pager has a housing, a clip member for attaching the housing to another article, the clip member being pivoted to said housing at a location that is spaced away from a first end of the clip member and a clip tensioning spring that acts to urge said first end of said clip member towards said housing, wherein said safety apparatus comprises:

a frame proportioned to fit between said pager housing and said clip member, an auxiliary spring carried by said frame in position to exert a force on said clip member that supplements the force that is exerted thereon by said clip tensioning spring, and means for selectively changing the force which said auxiliary spring exerts on said clip member, further including means for emitting a perceptible signal in response to pivoting of said clip member outwardly from said pager housing, wherein said means for emitting a perceptible signal includes a sensor housing proportioned to fit between said pager housing and said clip member and having means for retaining an electrical battery, an electrical switch attached to said sensor housing and having an actuator situated outside of said sensor housing in position to be held at a first switch setting by compression between said clip member and said pager housing when said clip member is pivoted towards said pager housing and to be released into a second switch setting when said clip member is pivoted away from said pager housing, an electrically actuated signal generator and means for transmitting current to said signal generator following movement of said actuator to said second switch setting, further including means for selectively changing the position of said switch actuator relative to said sensor housing.

11. Safety apparatus for assuring retention of a pager which has a housing, a pivotable clip member for attaching the housing to another article and a clip tensioning spring that acts to urge a first end of the clip member towards said pager housing, wherein said safety apparatus includes a pager removal sensor comprising:

a sensor housing proportioned to fit between said pager housing and said clip member and having means for retaining an electrical battery, an electrical switch attached to said sensor housing and having an actuator situated outside of said sensor housing in position to be held at a first switch setting by compression between said clip member and said pager housing when said clip member is pivoted toward said pager housing and to be released into a second switch setting when said clip member is pivoted outward from said pager housing, and electrically operated signaling means for emitting an perceptible signal at said pager housing when said actuator switches from said first switch setting to said second switch setting, and means for selectively changing the position of said actuator relative to said sensor housing.

12. Safety apparatus for assuring retention of a pager which has a housing, a pivotable clip member for attaching the housing to another article and a clip tensioning spring that acts to urge a first end of the clip member towards said pager housing, wherein said safety apparatus includes a pager removal sensor comprising:

a sensor housing proportioned to fit between said pager housing and said clip member and having means for retaining an electrical battery, an electrical switch attached to said sensor housing and having an actuator situated outside of said sensor housing in position to be held at a first switch setting by compression between said clip member and said pager housing when said clip member is pivoted toward said pager housing and to be released into a second switch setting when said clip member is pivoted outward from said pager housing, and electrically operated signaling means for emitting an perceptible signal when said actuator switches from said first switch setting to said second switch setting, further including a switch housing spaced apart from said sensor housing and which supports said switch actuator, an electrical connector extending between said sensor housing and said switch housing, and means for selectively changing the position of said switch actuator relative to said sensor housing.

13. The apparatus of claim 12 wherein said electrical connector is flexible enabling changing of the position of said switch housing relative to said sensor housing.

14. Safety apparatus for assuring retention of a pager which has a housing, a pivotable clip member for attaching the housing to another article and a clip tensioning spring that acts to urge a first end of the clip member towards said pager housing, wherein said safety apparatus includes a pager removal sensor comprising:

a sensor housing proportioned to fit between said pager housing and said clip member and having means for retaining an electrical battery, an electrical switch attached to said sensor housing and having an actuator situated outside of said sensor housing in position to be held at a first switching setting by compression between said clip member and said pager housing when said clip member is pivoted toward said pager housing and to be released into a second switch setting when said clip member is pivoted outward from said pager housing, and electrically operated signaling means for emitting a perceptible signal when said actuator switches from said first switch setting to said second switch setting, wherein said switch is attached to said sensor housing through a switch housing and may be extended outward relative to said switch housing and drawn inward relative to said switch housing, further including a rod coupled to said switch housing by means for enabling rotational turning of said rod, said rod having a region which protrudes away from the axis of rotation of the rod and which is positioned to bear against said switch and move said switch outward relative to said switch housing when said rod is turned, and means for holding said rod at a selected rotational orientation.

15. In a pager which produces a perceptible signal in response to radio signals and which has a pager housing, a clip member pivoted thereto for fastening the pager to another article and a clip tensioning spring which acts against said clip member to pivot the clip member towards the pager housing, the improvement comprising:

a frame secured to said pager between said pager housing and said clip member, an auxiliary spring carried by said frame and which is positioned to exert a force on said clip member that is separate from the force exerted thereon by said clip tensioning spring and which supplements the force that is exerted on said clip member by said clip tensioning spring, and means for selectively varying the tension in said auxiliary spring to adjust the force which said auxiliary spring exerts on said clip member.

16. The pager of claim 15 further including means for emitting a perceptible signal at said pager when said clip member is pivoted away from said pager housing.

17. In a pager which produces a perceptible signal in response to radio signals and which has a pager housing, a clip member pivoted thereto for fastening the pager to another article and a clip tensioning spring which acts to pivot the clip member towards the pager housing, the improvement comprising:

a sensor housing secured to said pager between said pager housing and said clip member and having means for retaining an electrical battery, an electrically actuated signal emitting device having means for emitting a signal at said pager that is perceptible to the owner of said pager, said signal emitting device being secured to said sensor housing, an electrical switch attached to said sensor housing and having a switch actuator positioned to be held at a first switch setting by compression between said clip member and said pager housing when said clip member is pivoted towards said pager housing and to be released into a second switch setting when said clip member is pivoted outward from said pager housing, and means for selectively changing the position of said switch actuator relative to said sensor housing, and means for transmitting electrical current to said signal emitting device when said actuator switches from said first setting thereof to said second setting thereof.

* * * * *